(12) United States Patent
Takamizawa et al.

(10) Patent No.: US 12,471,779 B2
(45) Date of Patent: Nov. 18, 2025

(54) BLOOD VESSEL DETECTION DEVICE AND METHOD THEREFOR

(71) Applicant: SAMSUNG ELECTRONICS CO., LTD., Gyeonggi-Do (KR)

(72) Inventors: Atsushi Takamizawa, Hokkaido (JP); Kazuya Iinaga, Hokkaido (JP); Ki Young Chang, Gyeonggi-do (KR); Joon Hyung Lee, Gyeonggi-do (KR); Kak Namkoong, Gyeonggi-do (KR); Yeol Ho Lee, Gyeonggi-do (KR); Won Jong Jung, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 746 days.

(21) Appl. No.: 17/793,566

(22) PCT Filed: Jan. 25, 2021

(86) PCT No.: PCT/JP2021/002407
§ 371 (c)(1),
(2) Date: Jul. 18, 2022

(87) PCT Pub. No.: WO2021/153490
PCT Pub. Date: Aug. 5, 2021

(65) Prior Publication Data
US 2023/0058347 A1 Feb. 23, 2023

(30) Foreign Application Priority Data
Jan. 28, 2020 (JP) .................. 2020-011512

(51) Int. Cl.
*A61B 5/1455* (2006.01)
*A61B 5/00* (2006.01)
(Continued)

(52) U.S. Cl.
CPC ........ *A61B 5/0059* (2013.01); *A61B 5/02007* (2013.01); *A61B 5/026* (2013.01)

(58) Field of Classification Search
CPC .................................. A61B 5/1455
See application file for complete search history.

(56) References Cited

U.S. PATENT DOCUMENTS 11,045,123 B2 * 6/2021 Honore ............... A61B 5/1455
2011/0301500 A1 12/2011 Maguire et al.
(Continued)

FOREIGN PATENT DOCUMENTS

JP     2011-206088     10/2011
JP     2015-123341     7/2015
(Continued)

OTHER PUBLICATIONS

International Search Report issued Mar. 23, 2021 in corresponding International Application No. PCT/JP2021/002407.

*Primary Examiner* — Marjan Fardanesh
(74) *Attorney, Agent, or Firm* — Wenderoth, Lind & Ponack, L.L.P.

(57) ABSTRACT

A blood vessel detection device comprises: a first irradiation unit for irradiating a predetermined site of a subject with light of a first wavelength that is absorbed less by hemoglobin or water and light of a second wavelength that is absorbed more by hemoglobin or water than the first wavelength; a second irradiation unit for irradiating the predetermined site with light of a third wavelength that is absorbed less by hemoglobin; a light intensity detection unit for detecting the intensity of light emitted from the subject at one or more positions spaced apart by a predetermined distance from the light irradiation positions of the first and second irradiation units or one or more contiguous positions; and a control unit that calculates blood vessel depth information, calculates blood vessel angle information, and deter- (Continued)

mines an optimal position for measurement based on the blood vessel depth information and the blood vessel angle information.

7 Claims, 16 Drawing Sheets

(51) Int. Cl.
    *A61B 5/02*     (2006.01)
    *A61B 5/026*     (2006.01)

(56) References Cited

U.S. PATENT DOCUMENTS

| | | |
|---|---|---|
| 2013/0231572 A1 | 9/2013 | Konishi et al. |
| 2015/0182150 A1 | 7/2015 | Ikeda |
| 2015/0313516 A1 | 11/2015 | Shimizu et al. |
| 2015/0374273 A1 | 12/2015 | Maguire |
| 2016/0367154 A1 | 12/2016 | Gladshtein et al. |
| 2019/0200866 A1 | 7/2019 | Eom et al. |
| 2021/0196135 A1 | 7/2021 | Takamizawa et al. |

FOREIGN PATENT DOCUMENTS

| | | |
|---|---|---|
| JP | 2019-120684 | 7/2019 |
| WO | 2014/087825 | 6/2014 |
| WO | 2019/225612 | 11/2019 |

\* cited by examiner

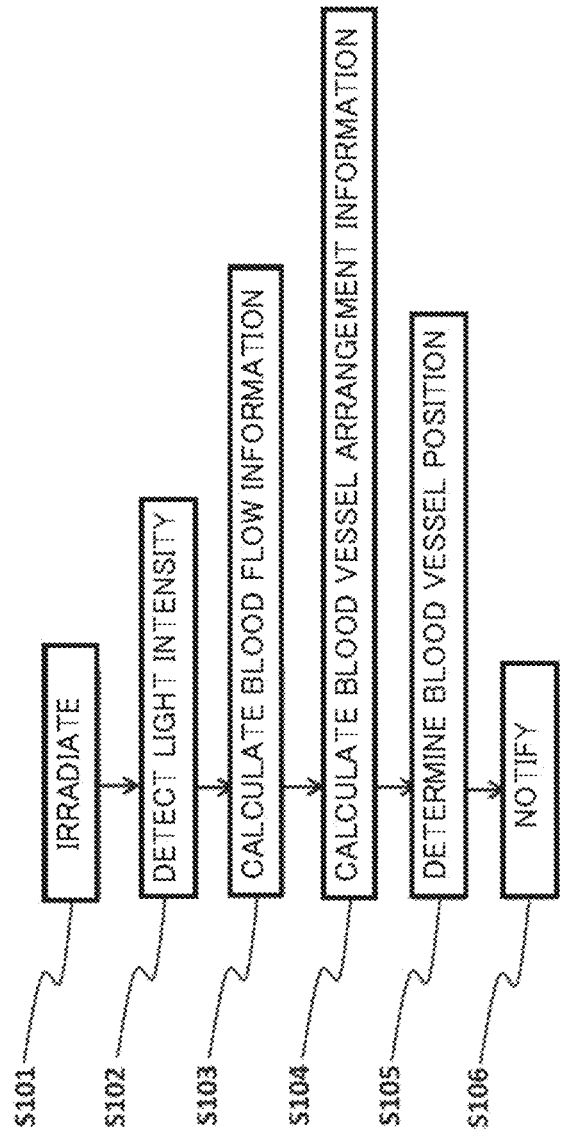

BLOOD VESSEL DETECTION DEVICE AND METHOD THEREFOR

TECHNICAL FIELD

The present invention relates to a blood vessel detection device and a method of the same.

BACKGROUND ART

Postprandial hyperlipidemia has been attracting attention as a risk factor for arteriosclerosis. It has been reported that a higher concentration level of neutral lipids during non-fasting increases the risk of developing events in coronary artery disease.

To diagnose postprandial hyperlipidemia, it is necessary to observe changes in blood lipid concentration for 6 to 8 hours after eating. In other words, in order to measure a postprandial hyperlipidemia state, it is necessary to restrain a subject for 6 to 8 hours and sample his or her blood multiple times. Hence, the diagnosis of postprandial hyperlipidemia is not beyond the scope of a clinical research, and it is not realistic to carry out the diagnosis of postprandial hyperlipidemia in a clinical practice.

A technique to solve the above problems is disclosed in Patent Literature 1. According to the technique of Patent Literature 1, non-invasive lipid measurement can eliminate blood sampling. This makes it possible to measure blood lipids not only at medical institutions but also at home. By enabling immediate data acquisition, it becomes possible to continuously measure blood lipids over time.

CITATION LIST

Patent Literature

Patent Literature 1: International Publication No. WO 2014/087825

SUMMARY OF INVENTION

Technical Problem

A conventional blood vessel search method is a two-dimensional search. However, in the non-invasive lipid measurement for a living body, a plurality of tissues is present between blood vessels and epidermis; and depending on the thickness of the tissues, this method is not suitable for measuring components in blood vessels in many cases. It can be said that a measurement position at which the blood vessel depth can be obtained in consideration of the thickness of the tissues is a suitable position for the lipid measurement.

In the non-invasive lipid measurement for a living body, there is a case in which a light emitting-receiving unit is arranged parallel to a blood vessel. Therefore, the optimum blood vessel position includes an arrangement that includes a relative angle with respect to the device.

An object of the present invention, which has been made in order to solve the above conventional problems, is to provide a blood vessel detection method and a device of the same that can detect a suitable measurement portion for the non-invasive measurement of the blood components.

Solution to Problems

A blood vessel detection device of the present invention includes: a first irradiation unit that irradiates a predetermined position of a subject with a light having a first wavelength with a smaller absorption by hemoglobin or by water and a light having a second wavelength with a larger absorption by hemoglobin or by water than that of the first wavelength; a second irradiation unit that irradiates the predetermined position of the subject with a light having a third wavelength with a smaller absorption by hemoglobin; a light intensity detection unit that detects a light intensity at not less than one position, the light intensity emitted from the subject at a predetermined distance or at continuous positions from irradiation positions of the lights from the first irradiation unit and the second irradiation unit; and a controller that calculates blood vessel depth information based on light intensities of a plurality of wavelengths of either or both of the first wavelength and the second wavelength, calculates blood vessel angle information based on light intensities of not less than one wavelength of either or both of the first wavelength and the third wavelength, and determines a position suitable for measurement based on the blood vessel depth information and the blood vessel angle information.

A blood vessel detection method of the present invention includes: irradiating a predetermined position of a subject with a light having a first wavelength with a smaller absorption by hemoglobin or by water, a light having a second wavelength with a larger absorption by hemoglobin or by water than that of the first wavelength, and a light having a third wavelength with a smaller absorption by hemoglobin; detecting a light intensity at not less than one position, the light intensity emitted from the subject at a predetermined distance or at continuous positions from irradiation positions of the lights; calculating blood vessel depth information based on light intensities of a plurality of wavelengths of either or both of the first wavelength and the second wavelength; calculating blood vessel angle information based on not less than one light intensity of either or both of the first wavelength and the third wavelength; and determining a position suitable for measurement based on the blood vessel depth information and the blood vessel angle information.

Advantageous Effects of Invention

According to the blood vessel detection device and the method of the same of the present invention, it is possible to enhance precision, such as accuracy and a precision level of a measured value in non-invasive lipid measurement.

BRIEF DESCRIPTION OF DRAWINGS

FIG. 11 is a flowchart of lipid measurement processing of the embodiment.

DESCRIPTION OF EMBODIMENTS

Hereinafter, the blood vessel detection device and the method of the same that are embodiments will be described in detail with reference to the drawings.

Figure 1:
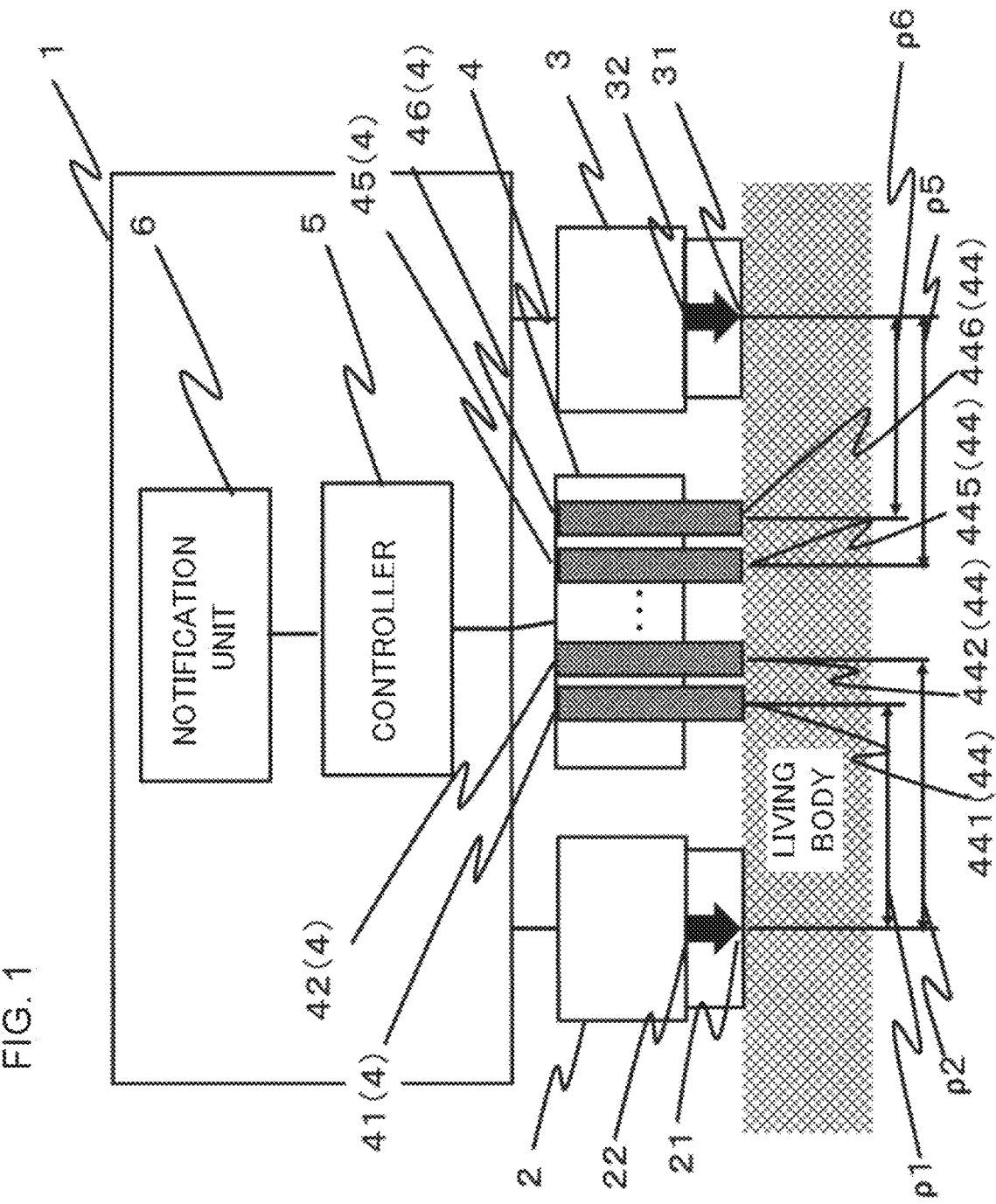
FIG. 1 is a diagram showing a configuration of a blood vessel detection device of an embodiment.
Figure 2:
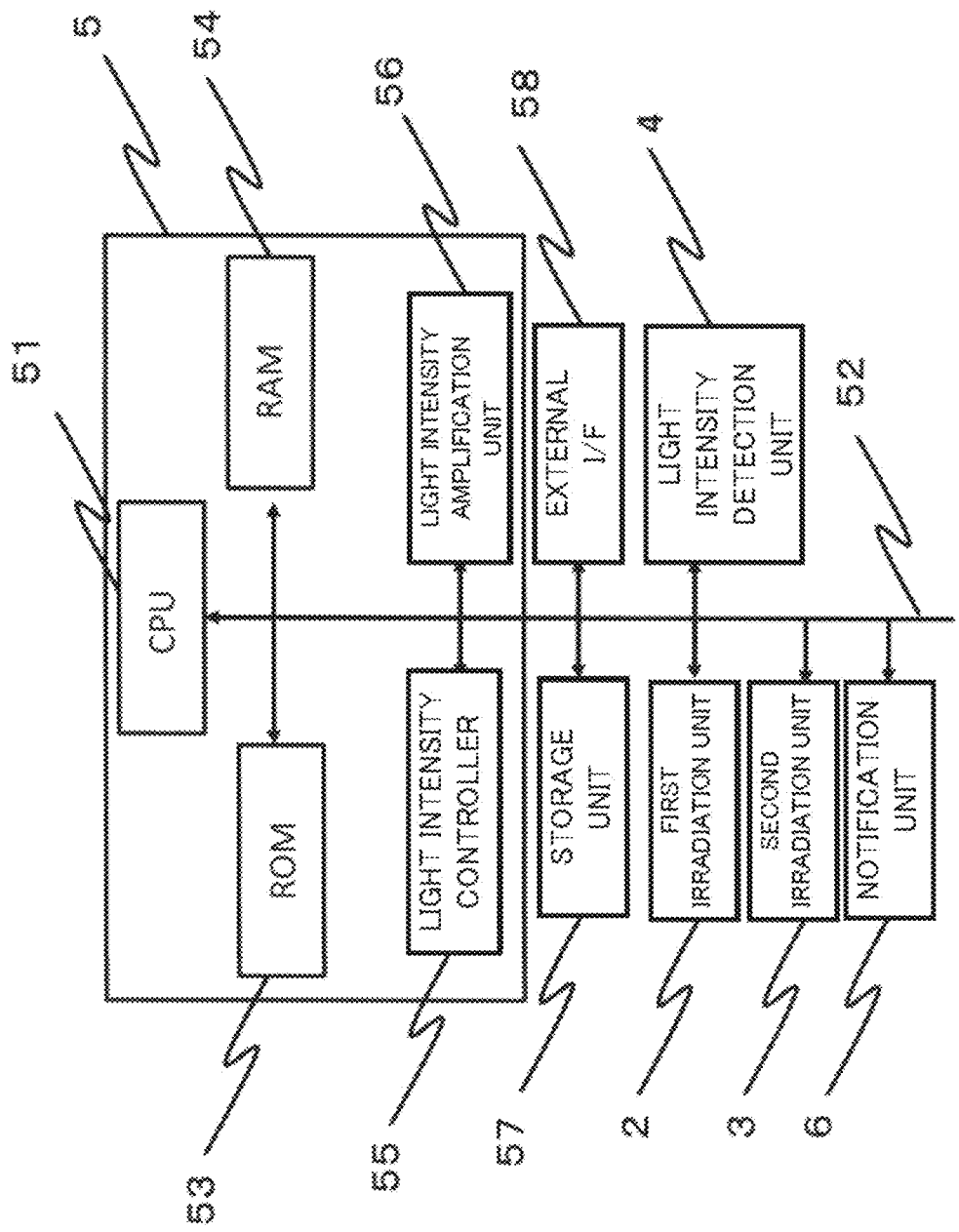
FIG. 2 is a block diagram showing a configuration of a control system.

FIG. 1 is a diagram showing the configuration of the blood vessel detection device according to the embodiment. FIG. 2 is a block diagram showing the configuration of the control system of the blood vessel detection device according to the embodiment.

As shown in FIG. 1, the blood vessel detection device 1 of the embodiment includes a first irradiation unit 2, a second irradiation unit 3, a light intensity detection unit 4, a controller 5, and a notification unit 6.

The first irradiation unit 2 includes a light source 22 for irradiating with a light a predetermined irradiation position 21 in a predetermined portion of a living body from the outside of the living body toward the inside of the living body. The light source 22 can adjust a wavelength of an irradiation light. As shown in FIG. 2, the light source 22 can adjust the irradiation intensity by a light intensity controller 55. The light source 22 can adjust the wavelength range to a range other than a wavelength range in which a light is absorbed by inorganic substances of blood plasma. The light source 22 can adjust the wavelength range to a range other than a wavelength range in which a light is absorbed by cell components in blood. Here, cell components in blood are erythrocyte, leucocyte and thrombocyte in blood. Inorganic substances of blood plasma are water and electrolytes in blood.

The first irradiation unit 2 of the embodiment can adjust the time length for irradiating a light to any time length, such as continuous irradiation of the light and pulsed irradiation of the light, based on the calculation method of the effective attenuation coefficient µeff by the controller 5 described later.

In the first irradiation unit 2, the light source 22 having a fixed wavelength may be used. The first irradiation unit 2 may be a plurality of light sources having different wavelengths or a mixture of lights having a plurality of wavelengths. The first irradiation unit 2 is, for example, a fluorescent lamp, an LED, a laser, an incandescent lamp, an HID, a halogen lamp, or the like. The illuminance of the first irradiation unit 2 is controlled by a light intensity controller 55, but may be controlled by the controller 5.

Figure 3A:
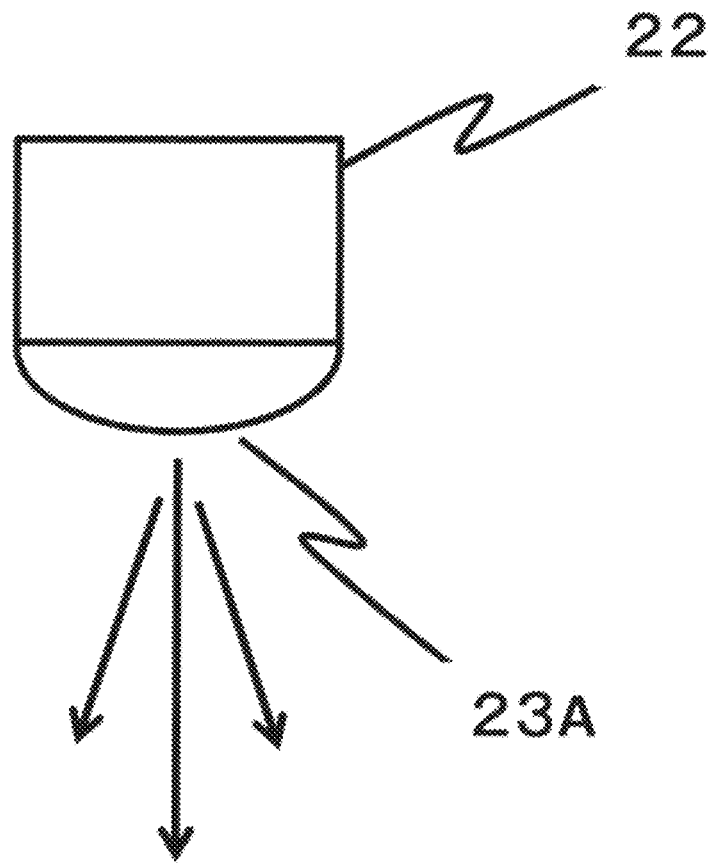
FIG. 3A is a diagram showing a configuration of a direction regulation unit.
Figure 3B:
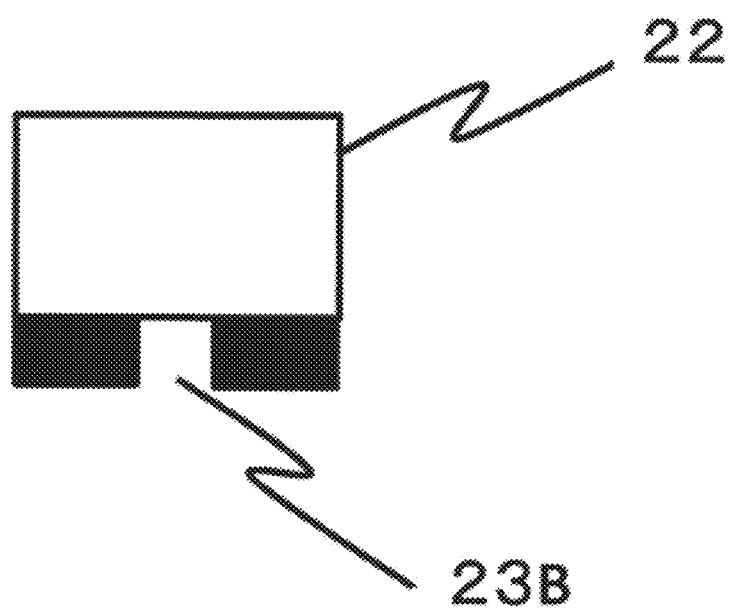
FIG. 3B is a diagram showing the configuration of the direction regulation unit.

In the embodiment, the light source 22 is an LED (light emitting diode). As shown in FIG. 3A, FIG. 3B, the light source 22 includes a direction regulation unit 23 for enhancing the linearity of the irradiation light from the LED. When the LED is used as it is for the light source 22, diffusion at the time of irradiation may cause an error to a measured value, as in a so-called ambient light. Furthermore, since the irradiation light diffuses on the surface of a living body, the irradiation light is affected by substances, such as skin, that exist between veins and the light source.

As shown in FIG. 3A, the irradiation unit 2 of the embodiment includes a lens 23A as the direction regulation unit 23 on a light emitting surface of the LED in the light source 22. Accordingly, diffusion components emitted from the LED in the light source 22 are reduced, and the rectilinear propagation of the light is enhanced.

In the embodiment, the aspect in which the direction regulation unit 23 is provided with the lens 23A has been explained; however, the present invention is not limited to this, and for example, the irradiation unit 2 may be provided with a pinhole 23B or the like, as shown in FIG. 3B, as the direction regulation unit 23 so as to enhance the rectilinear propagation of the light.

The light source 22 of the embodiment emits a light having the first wavelength and a light having the second wavelength, which are different from each other. The light having the first wavelength is a light for detecting blank information and blood flow information used for detecting a blood vessel depth. The light having the second wavelength is a light for detecting a tissue depth down to a blood vessel.

The light having the first wavelength is desirably a light having a wavelength that is less affected by blood, skin, or muscle, and preferably a light within a wavelength region, generally called as a "biological window", that is, a light within a wavelength region of 800 nm±50 nm (i.e., 750 nm or more and 850 nm or less).

The light having the second wavelength preferably has a wavelength with a strong absorption by hemoglobin, water, or the like. That is, the light having the second wavelength is preferably a light having a wavelength of 500 nm or more and 600 nm or less when hemoglobin is targeted, and preferably a light having a wavelength of 900 nm or more and 1200 nm or less when water is targeted.

The second irradiation unit 3 includes a light source 32 for irradiating with a light a predetermined irradiation position 31 in a predetermined portion of the living body from the outside of the living body toward the inside of the living body. The light source 32 can adjust the wavelength of the irradiating light. As shown in FIG. 2, the light source 32 can adjust the irradiation intensity by the light intensity controller 55. The light source 32 can adjust the wavelength range to a range other than a wavelength range in which the light is absorbed by inorganic substances of blood plasma. The light source 32 can adjust the wavelength range to a range other than a wavelength range in which the light is absorbed by cell components in blood. Here, cell components in blood are erythrocyte, leucocyte and thrombocyte in blood. Inorganic substances in blood plasma are water and electrolytes in blood.

The second irradiation unit 3 is preferably located on the opposite side of the first irradiation unit 2 with respect to the light intensity detection unit 4. As a result, lights are emitted toward the living body in two directions from the first irradiation unit 2 and the second irradiation unit 3.

The light intensity detection unit 4 includes a plurality of the light intensity detection units 4 (41, 42, 45, 46) and has a certain length. In the case of irradiating a light from only one direction, only the information of the light intensity detection unit 4 close to the light irradiating side is accurately detected for the arrangement. It is preferable to check light responses from two directions in order to confirm that the light intensity detection units 4 on the both sides are arranged accurately with respect to the blood vessel.

The second irradiation unit 3 can adjust the time length for irradiating a light to any time length, such as continuous irradiation of the light and pulsed irradiation of the light, based on the calculation method of the effective attenuation coefficient $\mu eff$ by the controller 5 described later.

For the second irradiation unit 3, the light source 32 having a fixed wavelength may be used. The second irradiation unit 3 may be a plurality of light sources having different wavelengths or a mixture of lights having a plurality of wavelengths. Examples of the second irradiation unit 3 include, for example, a fluorescent lamp, an LED, a laser, an incandescent lamp, a HID, a halogen lamp, and the like. The illuminance of the second irradiation unit 3 is controlled by the light intensity controller 55, but may be controlled by the controller 5.

In the embodiment, the light source 32 is an LED (light emitting diode). As in the light source 22, the light source 32 includes a direction regulation unit 33 (not shown) for enhancing the linearity of the irradiation light from the LED. When the LED is used as it is for the light source 32, diffusion during the irradiation may cause an error to a measured value as in a so-called ambient light. Furthermore, since the irradiation light diffuses on the surface of a living body, the irradiation light is affected by substances, such as skin, present between veins and the light source.

As in the first irradiation unit 2, the second irradiation unit 3 of the embodiment may include, on its light emitting surface, a lens, a pinhole, or the like, as the direction regulation unit.

The light source 32 of the embodiment irradiates a light having a third wavelength. The light having the third wavelength is a light for detecting the blank information and the blood flow information used for detecting the blood vessel depth.

The light having the third wavelength preferably has a wavelength that is less affected by blood, skin, muscle, etc., and preferably a wavelength having no absorption by hemoglobin (650 nm or more), in general. Further, the light having the third wavelength preferably has a wavelength not absorbed by water (900 nm or less).

The light intensity detection unit 4 receives a light emitted from the living body toward the outside of the living body, and detects the light intensity of this light. When a plurality of the light intensity detection units 4 (41, 42, 45, 46) is used, the light intensity detection units 4 (41, 42) are arranged at different distances from the irradiation position 21, respectively. As shown in FIG. 1, in the embodiment, the first light intensity detection unit 41 and the second light intensity detection unit 42 are arranged side by side on the same plane in a straight line at predetermined distances from the irradiation position 21. The light intensity detection unit 4 may be a photodiode, a CCD, or a CMOS.

Further, the light intensity detection units 4 (45, 46) are arranged at different distances from the irradiation position 31, respectively. In the embodiment, the irradiation position 31 is arranged on the opposite side of the irradiation position 21 with the light intensity detection units 4 interposed therebetween. The third light intensity detection unit 46 and the fourth light intensity detection unit 45 are arranged side by side on the same plane in a straight line at predetermined distances from the irradiation position 31.

The light received by the light intensity detection unit 4 is converted into photocurrent, and this photocurrent is amplified by a light intensity amplification unit 56 and processed by the CPU 51.

As shown in FIG. 1, in the embodiment, a distance from the irradiation position 21 to a first detection position 441 detected by the first light intensity detection unit 41 is defined as a first irradiation-detection distance $\rho 1$, and a distance from the irradiation position 21 to a second detection position 442 detected by the second light intensity detection unit 42 is defined as a second irradiation-detection distance $\rho 2$.

Further, as shown in FIG. 1, a distance from the irradiation position 31 to a nearest detection position 446 is defined as a third detection distance $\rho 6$, and a distance from the irradiation position 31 to a second nearest detection position 445 is defined as a fourth detection distance $\rho 5$.

Figure 4:
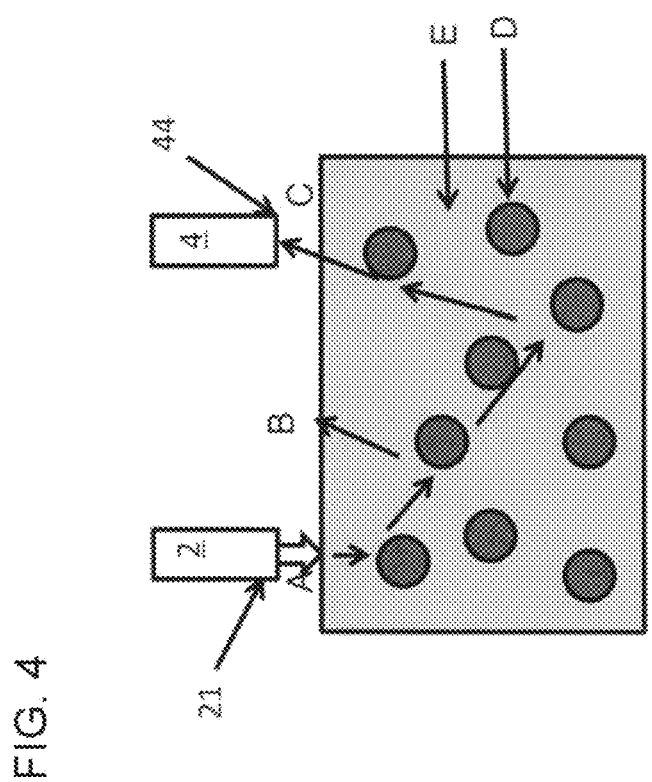
FIG. 4 is a diagram showing light scattering due to blood lipids.

As shown in FIG. 4, a predetermined distance $\rho$ is provided between the irradiation position 21 at which the living body is irradiated with the light and the detection position 44 at which the light intensity emitted from the blood (E in the drawing) in the living body is detected. The predetermined distance $\rho$ thus provided suppresses influence from a light directly emitted from the living body (B in the drawing) due to reflection of the irradiated light (A in the drawing) by a scatterer located on the surface of the living body and near the surface. After the irradiated light reaches a depth at which the blood is present, this light is reflected by the lipids (D in the drawing) in the blood.

FIG. 4 is also applied in the irradiation position 31 as shown in FIG. 1.

When a plurality of the detection positions 441, 442, 445, 446, or the like is arranged, the arrangement thereof is not limited to a linear manner as long as they are arranged at different distances from the irradiation positions 21, 31, respectively; and the arrangement thereof may be appropriately selected, such as a circular, wavy, or zigzag manner, and others. In addition, the first irradiation-detection distance $\rho 1$, the second irradiation-detection distance $\rho 2$, the third irradiation-detection distance $\rho 6$, and the fourth irradiation-detection distance $\rho 5$ from the irradiation positions 21, 31 to the respective detection positions 441, 442, 445, 446, the distance between the detection positions 441, 442, and the distance between the detection positions 445, 446 are not limited to constant distances, and may also be continuous.

Next, the configuration of the control system of the blood vessel detection device 1 will be described. FIG. 2 is a block diagram of the blood vessel detection device 1 of the embodiment. Via a system bus 52, a CPU (central processing unit) 51, a ROM (read only memory) 53, a RAM (random access memory) 54, the light intensity controller 55, the light intensity amplification unit 56, a storage unit 57, an external I/F (interface) 58, the first irradiation unit 2, the second irradiation unit 3, the light intensity detection unit 4, and the notification unit 6 are connected. The CPU 51, the ROM 53, the RAM 54, the light intensity controller 55, and the light intensity amplification unit 56 are included in the controller 5.

The ROM 53 previously stores programs and threshold values executed by the CPU 51.

The RAM 54 has various memory areas, such as an area for developing a program executed by the CPU 51, a work area for data processing by the program, and others.

The light intensity controller 55 adjusts the irradiation intensities of lights emitted from the first irradiation unit 2 and the second irradiation unit 3.

The light intensity amplification unit 56 includes an amplifier circuit that amplifies photocurrent generated when the light is received by the light intensity detection unit 4 (41, 42, 45, 46) at the detection position (441, 442, 445, 446).

The storage unit 57 stores data, such as the light intensity and the effective attenuation coefficient μeff that are detected and calculated. The storage unit 57 may be an internal memory, such as an HDD (hard disk drive), a flash memory, and an SSD (solid state drive), which stores data in a non-volatile manner.

The external I/F 58 is an interface for communicating with an external device, such as a client terminal (PC). The external I/F 58 may be an interface performing data communication with an external device, for example, and may be a device (a USB memory, or the like) locally connected to the external device, or a network interface for communication via a network.

The controller 5 calculates blood vessel arrangement information (e.g., blood vessel depth information and blood vessel angle information) in the living body based on the light intensity detected by the light intensity detection unit 4 (41, 42, 45, 46). The blood vessel arrangement information is calculated based on the detected light intensity, detected by the light intensity detection unit 4, in the irradiation light having a predetermined wavelength. In the embodiment, the blood vessel arrangement information is calculated based on the detected light intensities, detected by the light intensity detection unit 4, in the irradiation lights having the first wavelength and the second wavelength of the light source 22, and in the irradiation light having the third wavelength of the light source 32.

The light intensities obtained by the light intensity detection unit 4 include light intensities $I_1^\lambda, I_2^\lambda, \ldots I_n^\lambda$ respectively detected corresponding to the irradiations in the first wavelength, the second wavelength, and the third wavelength detected by the light intensity detection unit. Here, $\lambda$ is a wavelength of an irradiation light and n is the number of the light intensity detection units 4. In the present embodiment, n is four.

In addition, the light intensity obtained by the light intensity detection unit 4 is an effective attenuation coefficient μeff having a mixture of absorption information and scattering information.

The controller 5 in the embodiment calculates a light intensity ratio or a light intensity difference.

The controller 5 calculates the effective attenuation coefficient μeff by taking a logarithm of light intensities at a plurality of positions, the light intensities being detected by the light intensity detection unit 4 and amplified by the light intensity amplification unit 56. The controller 5 calculates the effective attenuation coefficient μeff based on a phenomenon that the received light intensity is gradually attenuated as the distance of the irradiated light from the detection position 44 becomes increased.

A continuous light is emitted from the first irradiation unit 2 or the second irradiation unit 3, and the controller 5 calculates, based on the light intensity detected at the light intensity detection position 44 (Formula 1), the effective attenuation coefficient μeff from a distance ρ between the light irradiation unit and the light intensity detection unit (the first to fourth irradiation-detection distances) as well as a product of a square of ρ and a light intensity R(ρ).

$$\ln(\rho^2 R(\rho)) = -\mu_{eff}\rho + \ln\frac{S_0}{2\pi}\frac{3\mu_a}{\mu_{eff}} \quad \text{[Formula 1]}$$

The effective attenuation coefficient μeff depends on the distances ρ between the light irradiation unit and the light intensity detection unit (the first to fourth irradiation-detection distances), and the wavelengths of the irradiation lights (the first to third wavelengths). The calculation method of the effective attenuation coefficient μeff calculated by the controller 5 is not limited to the above calculation method.

The effective attenuation coefficient μeff also includes an absorption coefficient μa, as shown in Formula 2.

$$\mu_{eff} = \sqrt{3\mu_a(\mu'_s + \mu_a)} \quad \text{[Formula 2]}$$

When the second wavelength having a large absorption by hemoglobin is used, the absorption coefficient μa becomes relatively large; therefore, the effective attenuation coefficient μeff depends on the absorption by hemoglobin.

Unlike skin tissues and others, blood as a measurement target flows in blood vessels. A dynamic parameter obtained by this blood flow is defined as the blood flow information. In the embodiment, the blood flow information is calculated and the blood vessel position is determined through measurement for a certain time period in the analysis.

The blood flow information is information obtained by using a wavelength (the first wavelength or the third wavelength) having small absorption or almost no absorption by substances in the living body. The purpose of this information is for suppressing influence of muscle contraction and blood flow variation due to exercise, and also qualitatively determining presence or absence of blood.

The controller 5 performs analyzation using a standard deviation, Brownian motion, an autocorrelation function, a frequency analysis, speckles, the Doppler shift, the Reynolds number, amount of blood flow, amount of blood, a pulsation width, etc., to calculate the blood flow information, which is an index for measuring movement of the blood. The measurement time period of the light intensity may be set to 20 sec or less, and the controller 5 may calculate the blood flow information from time fluctuation of the light intensity within this measurement time period.

Conventionally, in measurement at a measurement target portion, an averaged value is adopted without paying attention to the amount of fluctuation of measured values with time. However, in the blood measurement, it is preferable to carry out the measurement at blood-rich or blood-dense portions, such as veins, because they contain a lot of blood information, and thus noise factors become reduced. In the non-invasive measurement, it is desirable to acquire such information that is obtained by the blood flow in order to determine whether the incident light has passed through the veins.

For example, in a pulse measurement, arteries are preferable because the periodicity due to heartbeats is measured. However, in the embodiment in which veins are used as a measurement target, the above periodicity is not confirmed. Hence, for positioning the optimum measurement portion, it is preferable to measure fluctuation of time change in the received light intensity due to the blood flow within a certain time period.

That is, when periodicity of pulsation (about 0.5 to 2.0 Hz) is observed, although existence of blood is confirmed, a lot of information other than veins is also included. On the other hand, the blood flow information that exhibits no periodicity of pulsation and has no periodicity corresponds to information indicating a position of a vein (at least depending on the vein information), and this can be considered as a portion of the living body suitable for the lipid measurement of the present invention.

In order to distinguish the above information, the sampling rate of the light intensity detection unit is preferably set to 10 msec or less, and the resolution thereof is preferably set to 16 bits or more.

The blood flow information includes a coefficient of variation CV indicating the magnitude of time fluctuation of a light intensity I detected by the light intensity detection unit 4 and a coefficient of variation CV indicating the magnitude of time fluctuation of the effective attenuation coefficient μeff.

The controller 5 calculates the coefficient of variation CV of the light intensity from the time change (time fluctuation) of the light intensity that is calculated. The coefficient of variation CV can be calculated by the following Formula 3, for example.

$$X = \frac{\sigma}{\bar{x}} \quad \text{[Formula 3]}$$

x: actual measured value of light intensity
$\bar{x}$: averaged value of actual measured values of light intensity
σ: standard deviation of light intensity
X: fluctuation in certain time period =coefficient of variation CV of μeff The standard deviation of the light intensity is calculated by the following Formula 4.

$$\sigma = \sqrt{\langle x^2 \rangle - \bar{x}^2} \quad \text{[Formula 4]}$$

Where < > represents an average.

For calculating the coefficient of variation CV, the time period of measuring the light intensity is preferably set to 1 msec or more and 30 sec or less, more preferably 5 msec or more and 25 sec or less, and further more preferably 10 msec or more and 20 sec or less ("sec" is an abbreviation for "seconds").

The controller 5 calculates the blood vessel depth information based on the effective attenuation coefficient μeff or the absorption coefficient μa from the irradiation light having the first wavelength of the first irradiation unit 2 (Arithmetic expression 1 described later). Further, the controller 5 calculates the blood vessel depth information based on the effective attenuation coefficient μeff and the absorption coefficient μa from the irradiation lights having the first wavelength and the second wavelength of the first irradiation unit 2 (Arithmetic expression 2 described later).

The controller 5 calculates the blood vessel angle information based on the light intensity I from the irradiation light having the third wavelength of the second irradiation unit 3 (Arithmetic expression 3 described later). Further, the controller 5 calculates the blood vessel angle information based on the coefficient of variation CV of the effective attenuation coefficient μeff from the irradiation light having the first wavelength of the first irradiation unit 2 and the coefficient of variation CV of the light intensity I from the irradiation light having the third wavelength of the second irradiation unit 3 (Arithmetic expression 4 described later).

Then, the controller 5 determines the blood vessel arrangement based on the blood vessel depth information and the blood vessel angle information.

Figure 5:
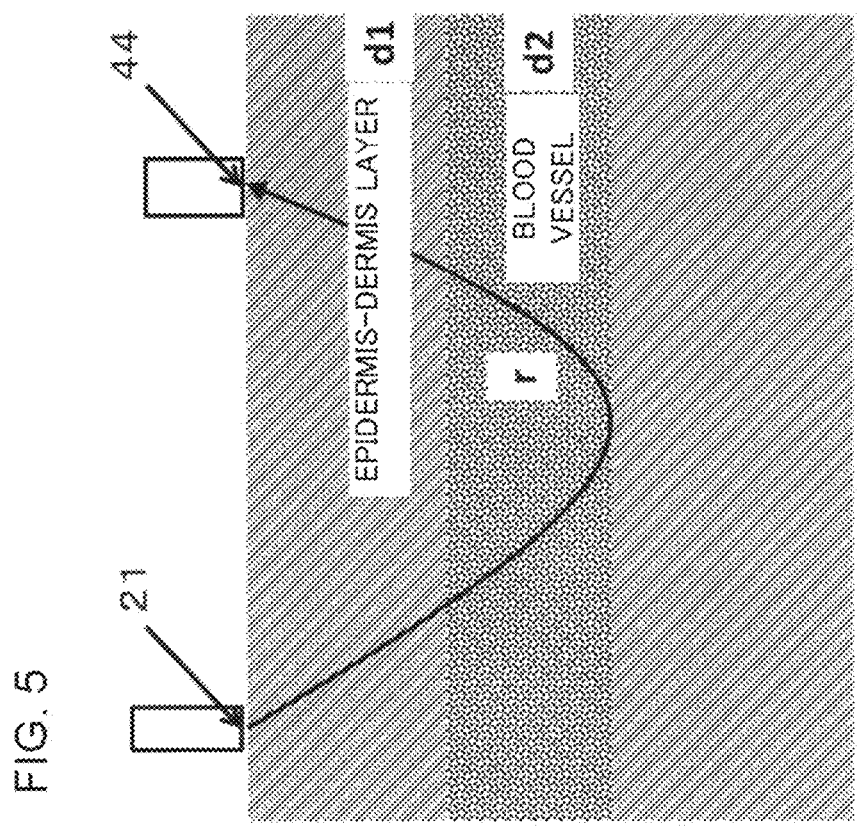
FIG. 5 is a schematic diagram showing a skin and a blood vessel in a simple manner.

The embodiment provides a device and a method of searching for the blood vessel depth information. As shown in FIG. 5, an optical path through which a light averagely passes up to the light the irradiation position 21 and the light detection position 44 is defined as r. Further, the thickness of the epidermis-dermis layer is defined as d1, and the thickness of the blood vessel layer (i.e., the thickness of the blood vessel) is defined as d2.

The scattering information is obtained from the epidermis-dermis layer and the blood vessel layer. The blood flow information is obtained only from the blood vessel layer.

Figure 6:
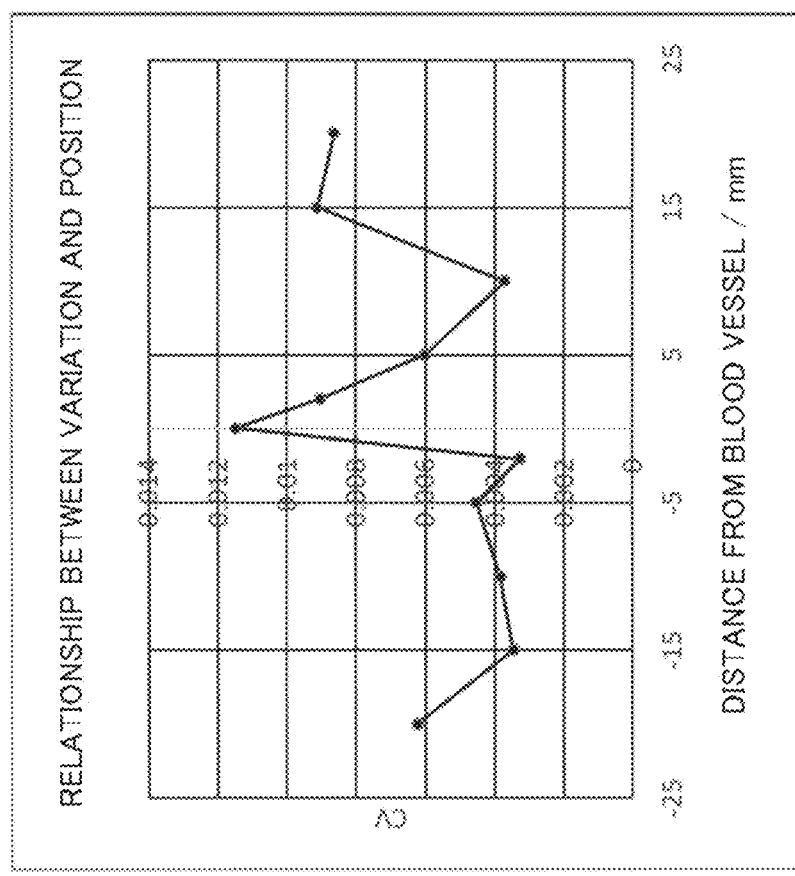
FIG. 6 is a diagram showing a relationship between a coefficient of variation of an effective attenuation coefficient and a blood vessel position.

FIG. 6 shows plotting between a parallel deviation distance on the horizontal axis when a distance at which a measurement is carried out right above a vein in a human forearm is defined to 0, and the coefficient of variation CV of the effective attenuation coefficient μeff at a wavelength of 810 nm, as the blood flow information, on the vertical axis. As shown in FIG. 6, the coefficient of variation CV is likely to be maximum (slightly less than 0.0012 in the drawing, that is, slightly less than 1.2%) right above the blood vessel.

The controller 5 detects a measurement error when the coefficient of variation CV of the effective attenuation coefficient μeff of the first wavelength is too small as the blood flow information.

The range in which the coefficient of variation CV is recognized as a measurement error is 0.5% or less.

The behavior of a light with respect to the epidermis-dermis layer and the behavior of a light with respect to the blood vessel layer are different depending on each wavelength. For example, the light having the second wavelength is greatly affected by the absorption as the light passes through the blood vessel layer. The light having the first wavelength is affected by the absorption in the same manner in the epidermis-dermis layer and in the blood vessel layer, but is mostly affected by absorption by water. A light at 810 nm is hardly absorbed in the epidermis-dermis layer. Hence, based on such differences in characteristics, the depth information is calculated.

The effective attenuation coefficient μeff can be found based on the light intensities detected by the first light intensity detection unit 41 and the second light intensity detection unit 42, using the above Formula 1.

Figure 7A:
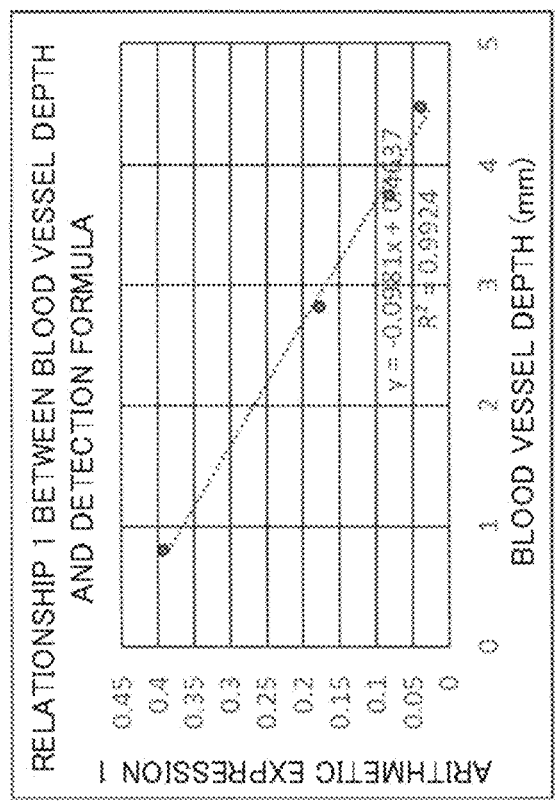
FIG. 7A is a diagram showing a relationship between an arithmetic expression representing blood vessel depth information and a blood vessel depth.

The controller 5 calculates the blood vessel depth information based on the effective attenuation coefficient found from the light intensity obtained by the irradiation lights having the first wavelength (810 nm) and the second wavelength (970 nm) of the first irradiation unit 2, using Arithmetic expression 1 of the following Formula 5. The calculation result is shown in FIG. 7A.

For actually proving the calculation of the blood vessel depth information using Arithmetic expression 1 of the following Formula 5, an experiment was conducted using a blood vessel phantom with a hollow hole made from the surface of a solid simulated living body (solid phantom) under a condition with a constant depth from the surface. FIG. 7A shows a relationship between the blood vessel depth information from the Arithmetic expression 1 of the following Formula 5 and a blood vessel hole depth (the blood vessel depth) of the blood vessel phantom.

$$\text{(blood vessel depth)} \propto \text{(Arithmetic expression 1)} = \left(\frac{\mu_{eff}^{970}}{\mu_{eff}^{810}}\right)^2 \cong \frac{\mu_a^{970}}{\mu_a^{810}} \quad \text{[Formula 5]}$$

In Formula 5, the blood vessel depth is proportional to the blood vessel depth information from Arithmetic expression 1, μeff represents the effective attenuation coefficient, and the upper right subscript (810, 970) represents a wavelength (nm) (that is, representing the effective attenuation coefficient obtained using Formula 1 when the wavelengths of the irradiation lights are 970 nm and 810 nm). In addition, μa represents the absorption coefficient, and the upper right subscript (810, 970) represents a wavelength (nm) (that is, representing the absorption coefficient obtained using Formula 1 and Formula 2 when the irradiation lights have the wavelengths of 970 nm and 810 nm). 810 nm is the first wavelength of the first irradiation unit 2, and 970 nm is the second wavelength of the first irradiation unit 2.

From FIG. 7A, the optimum range when the blood vessel depth information obtained from Arithmetic expression 1 in Formula 5 is used is preferably set to 1.4<(blood vessel depth information from Arithmetic expression 1)<2.0, which is a range found through measurement of the living body in an actual lipid absorption test conducted by the present inventors. It is preferable that the optimum range in the case of using the blood vessel depth information obtained from Arithmetic expression 1 in Formula 5 is set by changing a full applied range according to the light intensity or the light receiving distance.

Figure 12A:
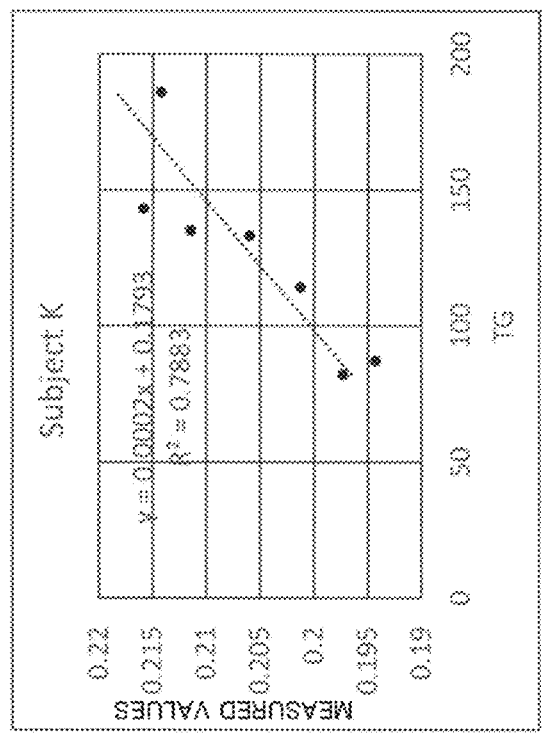
FIG. 12A is a diagram showing verification of an error determination function.
Figure 12B:
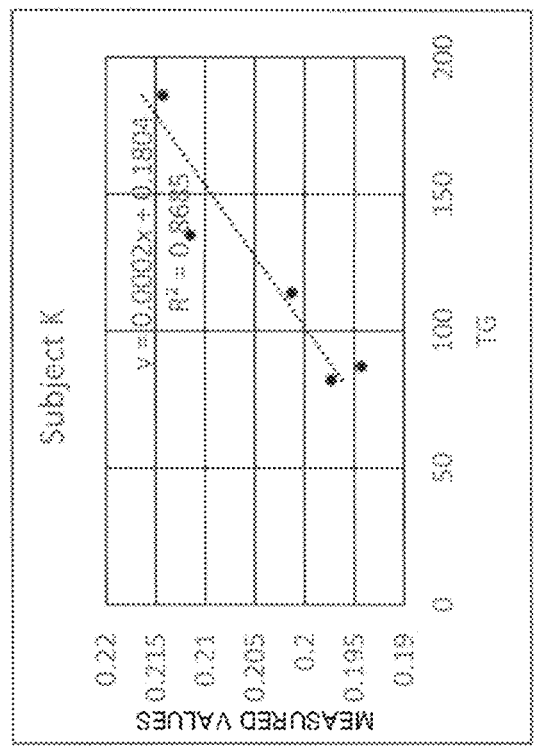
FIG. 12B is a diagram showing the verification of the error determination function.

For the purpose of studying measurement suitability of a blood vessel as a lipid measurement target, the lipid absorption test was conducted based on the method described in the above Patent Literature 1 (WO 2014/087825 A); and FIG. 12A and FIG. 12B are drawings each showing verification of a correlation with the blood lipid concentration, using the blood lipid concentration on the horizontal axis and a wavelength of 810 nm (the first wavelength) on the vertical axis. Only measurements within a range of the blood vessel depth information obtained from Arithmetic expression 1 of 1.4<(the blood vessel depth information from Arithmetic expression 1)<2.0 were deemed as successful measurements, and the other measurements were excluded as errors. As a result, an R-squared value representing a correlation of measured values using the optical method and the blood sampling method has been improved to 0.788 (FIG. 12B).

When the blood vessel depth d1 is derived from the blood vessel depth information obtained from the Arithmetic expression 1 in Formula 5, the blood vessel depth d1 can be calculated from the following proportional relational formula (Formula 6) shown in FIG. 7A.

(blood vessel depth information obtained from Arithmetic expression 1)=−0.0981 (blood vessel depth $d1$)+0.4637 [Formula 6]

Further, the controller 5 calculates the blood vessel depth information based on the effective attenuation coefficient obtained by the light intensity of the irradiation lights having the first wavelength (810 nm) and the second wavelength (505 nm) of the first irradiation unit 2, using the Arithmetic expression 2 in the following Formula 7.

Figure 7B:
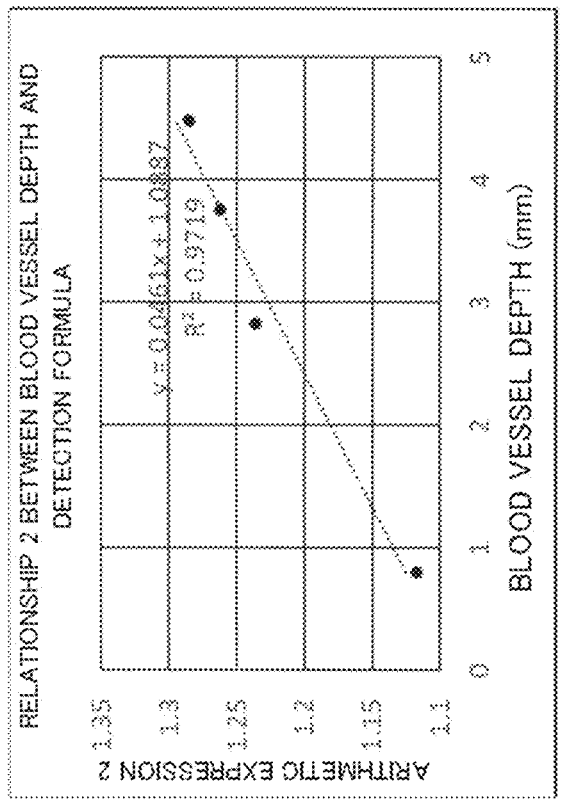
FIG. 7B is a diagram showing the relationship between an arithmetic expression representing the blood vessel depth information and the blood vessel depth.

For actually proving the calculation of the blood vessel depth information using the Arithmetic expression 2 in the following Formula 7, an experiment was conducted by using a blood vessel phantom formed with a hollow hole from the surface of a solid simulated living body (solid phantom) under a condition with a constant depth from the surface. FIG. 7B shows a relationship between the blood vessel depth information obtained by using Arithmetic expression 2 in the following Formula 7 and the blood vessel hole depth (blood vessel depth) of the blood vessel phantom.

$$\text{(blood vessel depth)} \propto \text{(Arithmetic expression 2)} = 1 - \frac{\left(\frac{\mu_{eff}^{505}}{\mu_{eff}^{810}} - 1\right)}{\left(\sqrt{\frac{\mu_{a\_blood}^{505}}{\mu_{a\_blood}^{810}}} - 1\right)} \quad \text{[Formula 7]}$$

In Formula 7, the blood vessel depth is proportional to the blood vessel depth information obtained from Arithmetic expression 2, and the upper right subscript (505, 810) of the effective attenuation coefficient μeff represents the optical wavelength (nm) (that is, representing the effective attenuation coefficient obtained by the irradiation lights having the wavelengths of 505 nm and 810 nm, using Formula 1). The lower right subscripts of the denominators μ in the fraction on the right side in Formula 7 represent absorption by blood, and the upper right subscripts (505, 810) thereof represent the above wavelength (nm) (i.e., the absorption coefficient obtained by the irradiation lights having the wavelengths of 505 nm and 810 nm, using Formula 1 and Formula 2). 505 nm is the second wavelength of the first irradiation unit 2. 810 nm is the first wavelength of the first irradiation unit 2.

The subscript μ in Formula 7 represents the absorption by blood, the fraction represents a ratio of the absorption of blood in the first wavelength to the absorption of blood in the second wavelength, and the range thereof is generally expressed by the following Formula 8.

$$3 < \sqrt{\frac{\mu_{a\_blood}^{505}}{\mu_{a\_blood}^{810}}} < 6 \quad \text{[Formula 8]}$$

When the blood vessel depth d1 is derived from the blood vessel depth information obtained by using the Arithmetic expression 2 in Formula 7, this can be calculated using the following proportional relational formula (Formula 9) from FIG. 7B.

(blood vessel depth information obtained from Arithmetic expression 2)=0.0461 (blood vessel depth $d1$)+1.0087 [Formula 9]

In FIG. 7B, the denominator of Formula 7 is 4.48.

The calculation method of the blood vessel depth information calculated by the controller 5 is a calculation method of the depth information obtained by the calculation of the scattering information (effective attenuation information), and is not limited to the above calculation method.

That is, even if using either Formula 5 or Formula 7, it is possible to calculate the blood vessel depth information in a blood vessel at a depth within a constant range by detecting, as an error, a value out of the range of the blood vessel depth where a value accurately reflecting lipids can be obtained in the lipid measurement.

When the coefficient of variation CV (blood flow information) is 0.5% or more, and when the blood vessel depth information obtained from the calculation of the effective attenuation coefficient represented by Formula 5 or Formula 7 is within a constant range that is preset(e.g., more than 1.4 and less than 2.0), based on the experiment using the blood vessel phantom or the like, the controller 5 determines that the blood vessel depth is a blood vessel depth at which preferable data can be obtained in the non-invasive lipid measurement.

Further, the controller 5 calculates the blood vessel angle information based on the light intensity obtained from the irradiation light having the third wavelength (660 nm) of the second irradiation unit 3, using Arithmetic expression 3 in the following Formula 10. When Arithmetic expression 1 in the above Formula 5 and Arithmetic expression 3 in the following Formula 10 simultaneously satisfy a certain range, the controller 5 determines that the light intensity detection unit 4 (41, 42, 45, 46) of the blood vessel detection device 1 is arranged in parallel right above the blood vessel.

$$\text{(blood vessel angle information)} = \text{(Arithmetic expression 3)} = \frac{I_5^{660}}{I_6^{660}} \quad \text{[Formula 10]}$$

That is, based on the blood vessel depth information and the blood vessel angle information, the controller 5 determines that the arrangement direction of the light intensity detection unit 4 (41, 42, 45, 46) of the blood vessel detection device 1 and the direction of the blood vessel are parallel to the horizontal direction.

Figure 8A:
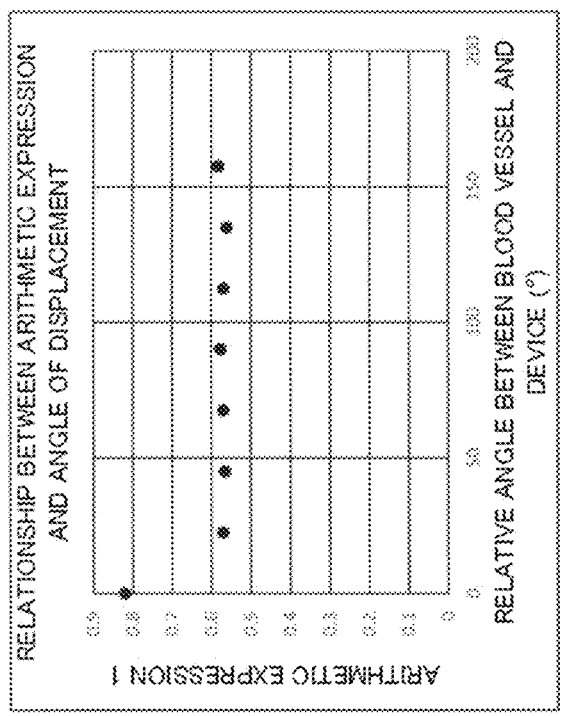
FIG. 8A is a diagram showing a relationship between an arithmetic expression representing horizontal blood vessel arrangement information and an arrangement angle.
Figure 8B:
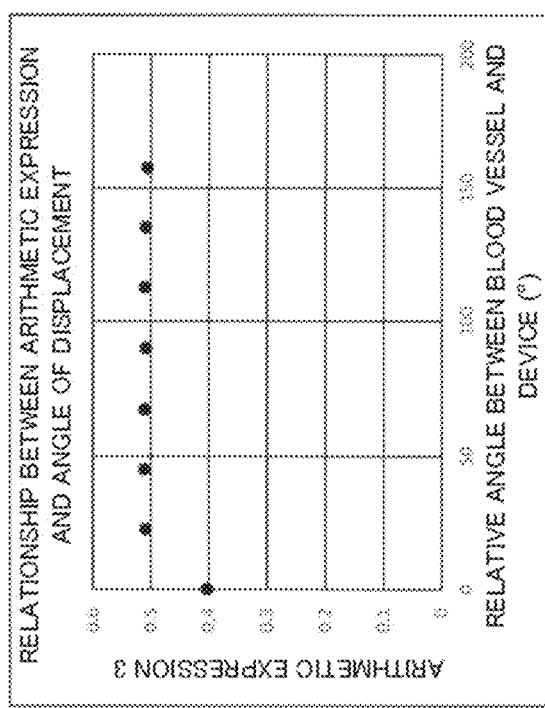
FIG. 8B is a diagram showing a relationship between an arithmetic expression representing the horizontal blood vessel arrangement information and the arrangement angle.

For actually proving the blood vessel depth information obtained from Arithmetic expression 1 in Formula 5 and the blood vessel angle information obtained from Arithmetic expression 3 in the following Formula 10, an experiment was conducted using a blood vessel phantom formed with a hollow hole from the surface of a solid simulated living body (solid phantom) under a constant depth condition. FIG. 8A shows a relationship between the blood vessel depth information obtained from Arithmetic expression 1 in the following Formula 5, and the angle of displacement between the direction of the blood vessel in the blood vessel phantom and a PD arrangement direction of the blood vessel detection device 1 (arrangement direction of the light intensity detection units 4 (41, 42, 45, 46)). FIG. 8B shows a relationship between the blood vessel angle information obtained from Arithmetic expression 2 in the following Formula 10, and the angle of displacement between the direction of the blood vessel in the blood vessel phantom and the PD arrangement direction of the blood vessel detection device 1 (arrangement direction of the light intensity detection units 4 (41, 42, 45, 46)). When the value from Arithmetic expression 1 falls within a certain range, this indicates that the first irradiation unit 2 side is arranged right above the blood vessel.

When the constant range is satisfied in one or both of the blood vessel depth information and the blood vessel angle information, the controller 5 determines that the blood vessel detection device 1 is arranged such that the arrangement direction of the light intensity detection unit 4 (41, 42, 45, 46) and the direction of blood vessel are arranged in a parallel relationship.

The "parallel relationship", referred to herein, between the arrangement direction of the light intensity detection unit 4 (41, 42, 45, 46) and the direction of the blood vessel includes a horizontal direction and a vertical direction.

Figure 9A:
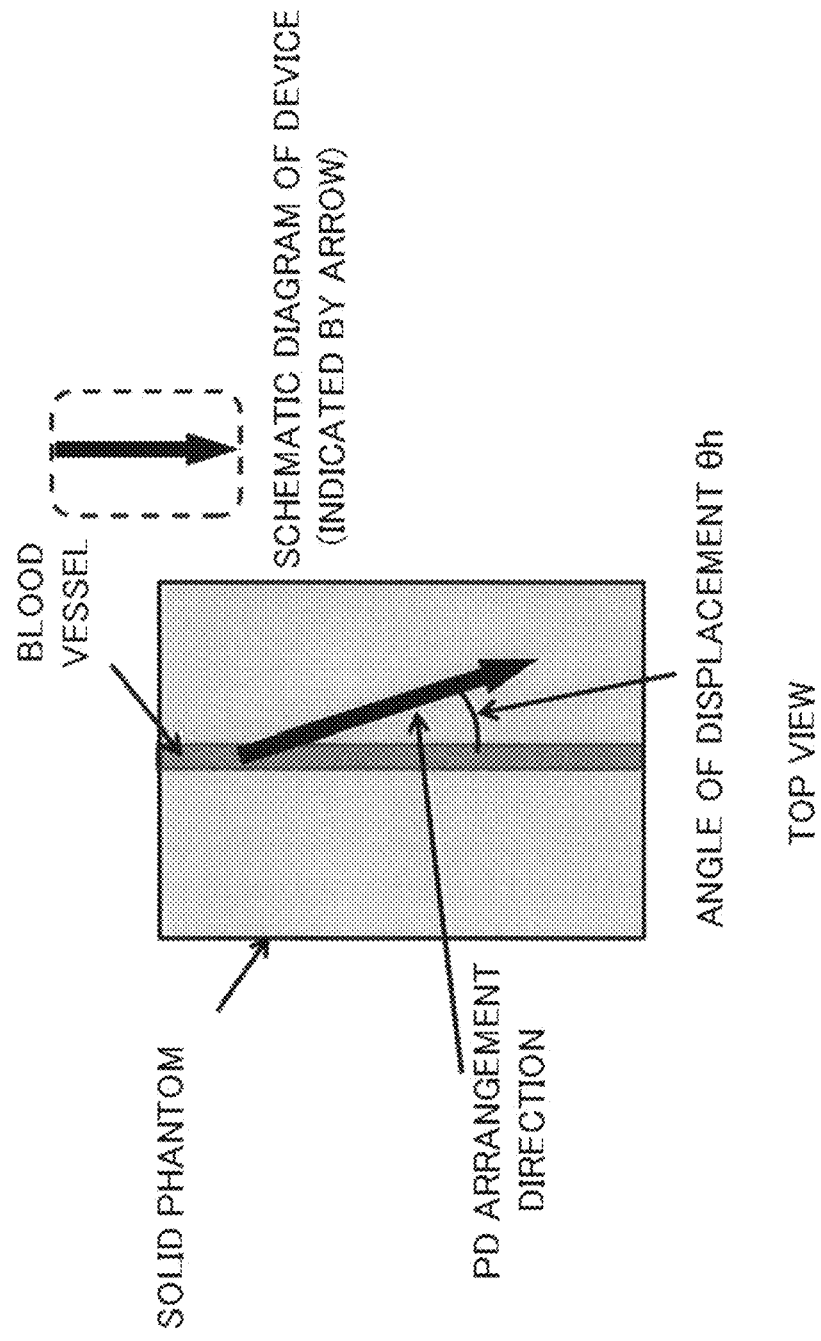
FIG. 9A is a diagram showing an arrangement relationship between a simulated living body and a device.
Figure 9B:
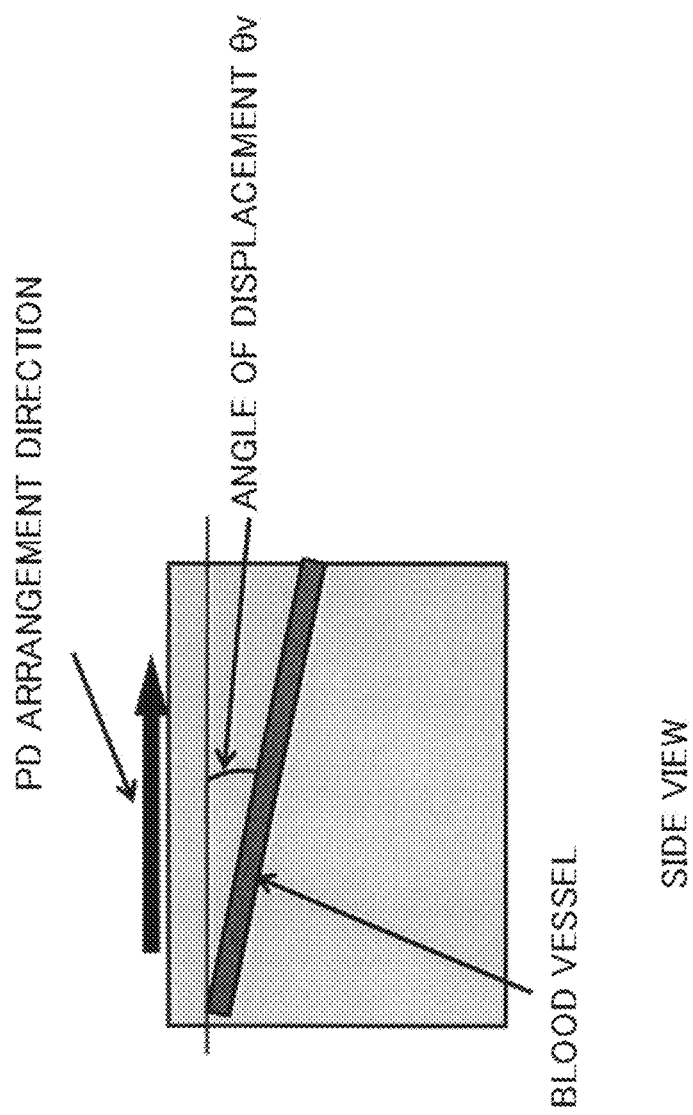
FIG. 9B is a diagram showing the arrangement relationship between the simulated living body and the device.

FIG. 9A is a top view showing a relationship between the blood vessel detection device and a blood vessel of the living body, and FIG. 9B is a side view showing a relationship between the blood vessel detection device and the blood vessel of the living body. As shown in FIG. 9A, there is an angle of displacement θh in the horizontal direction formed between the arrangement direction of the light intensity detection unit 4 (41, 42, 45, 46) and the blood vessel. When the angle of displacement θh is 0, the arrangement is considered to be parallel to the horizontal direction.

As shown in FIG. 9B, there is an angle of displacement θv in the vertical direction formed between the arrangement direction of the light intensity detection unit 4 (41, 42, 45, 46) and the blood vessel. When the angle of displacement θv is 0, the arrangement is considered to be parallel to the vertical direction.

From the above Arithmetic expression 3, it can be determined that the arrangement direction of the light intensity detection unit 4 (41, 42, 45, 46) and the direction of the blood vessel are parallel to each other. In addition, even if this determination cannot be made by using only Arithmetic expression 3, this parallel arrangement can be determined by also using the above Arithmetic expression 1. Theoretically, in a portion where there exists blood, attenuation due to the distance from the light irradiation position becomes large; therefore, a value tends to be small when a ratio is adopted. When Arithmetic expression 3 is too large, it is considered that the second irradiation unit side is not arranged above the blood vessel, and when Arithmetic expression 1 is too small, it is considered that the first irradiation unit side is not arranged above the blood vessel; therefore, if the both are satisfied, the arrangement is considered to be in parallel to the blood vessel. From FIG. 8B, the range of Arithmetic expression 3 is 0.47 or less in Example of the phantom.

When the value in the above Arithmetic expression 3 falls within a range that is preset based on the experiment using the blood vessel phantom, the controller 5 determines that the light intensity detection unit 4 (45, 46) on the second irradiation unit 3 side is arranged right above the blood vessel.

When the values in the above Arithmetic expression 1 and the above Arithmetic expression 3 simultaneously fall within a predetermined setting range, the controller 5 determines that the light intensity detection unit 4 (41, 42, 45, 46) is arranged right above the blood vessel.

From FIG. 8A, the optimal range, when the blood vessel depth information obtained from Arithmetic expression 1 in Formula 5 is used, is preferably set to (Arithmetic expression 1)>0.7 when the solid simulated living body is used. The optimal range when the blood vessel depth information obtained from Arithmetic expression 1 is used is preferably changed in its full applied range, depending on the light intensity, the light receiving distance, or a target object.

From FIG. 8B, the optimal range when the blood vessel angle information obtained from Arithmetic expression 3 is used is preferably set to (Arithmetic expression 3)<0.41 when the solid simulated living body is used. The optimal range when the blood vessel depth information from Arithmetic expression 2 is used is more preferably changed in its full applied range, depending on the light intensity, the light receiving distance, or the target object.

The controller 5 may calculate the blood vessel angle information based on the coefficient of variation of the effective attenuation coefficient obtained from the light intensities obtained by the irradiation lights having the first wavelength (810 nm) and the second wavelength (660 nm) of the first irradiation unit 2, and on the coefficient of variation of the light intensity obtained by the irradiation light having the third wavelength (660 nm) of the second irradiation unit 3, using Arithmetic expression 4 in the following Formula 11. The controller 5 determines that the blood vessel depth is substantially constant in the measurement range in which the following Arithmetic expression 4 satisfies a certain numerical range.

That is, the controller 5 determines that the light intensity detection unit 4 (41, 42, 45, 46) of the blood vessel detection device 1 is parallel to the blood vessel with respect to the vertical direction.

$$\text{(blood vessel angle information)} = \quad \text{[Formula 11]}$$

$$\text{(Arithmetic expression 4)} = \frac{CV\mu_{\text{eff}}^{810}}{CVI_5^{660}}$$

In Formula 11, the numerator represents the coefficient of variation of the effective attenuation coefficient μeff, the denominator represents the coefficient of variation of the detected light intensity I, and the upper right subscript represents the wavelength of the irradiation light.

The optimal range when the blood vessel angle information obtained from Arithmetic expression 4 in Formula 11 is used is preferably set to (Arithmetic expression 4)>1.5. The optimal range when the blood vessel angle information from Arithmetic expression 4 is used is more preferably changed in its full applied range, depending on the light intensity, the light receiving distance, or the target object.

Figure 10A:
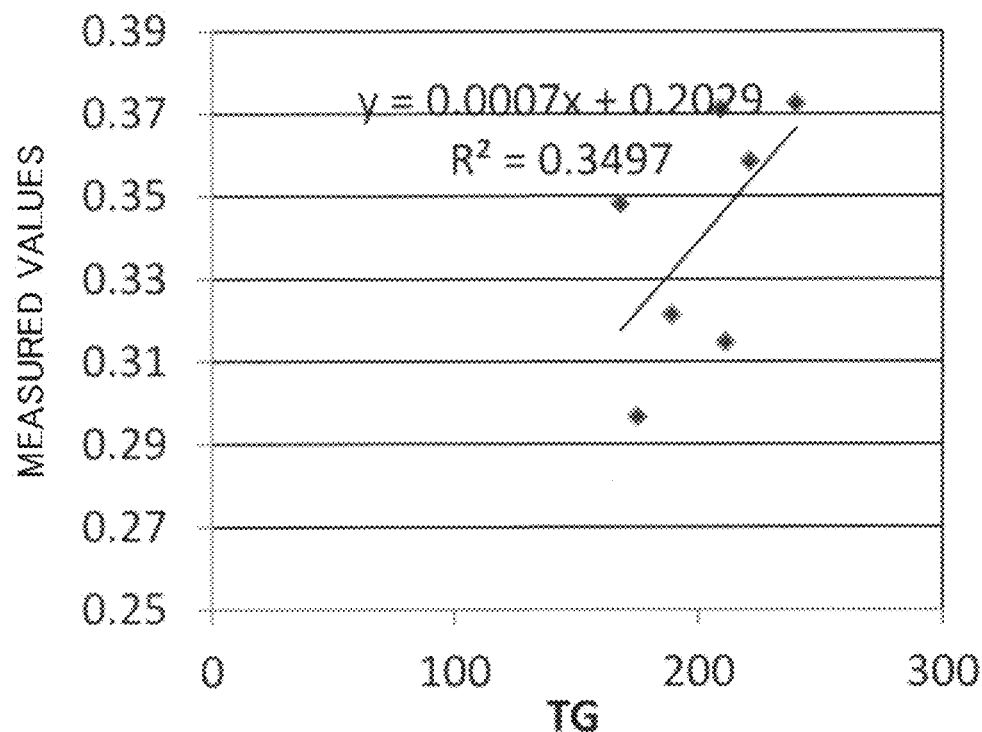
FIG. 10A is a diagram showing a relationship between blood lipid levels and measured values in a human lipid absorption test.
Figure 10B:
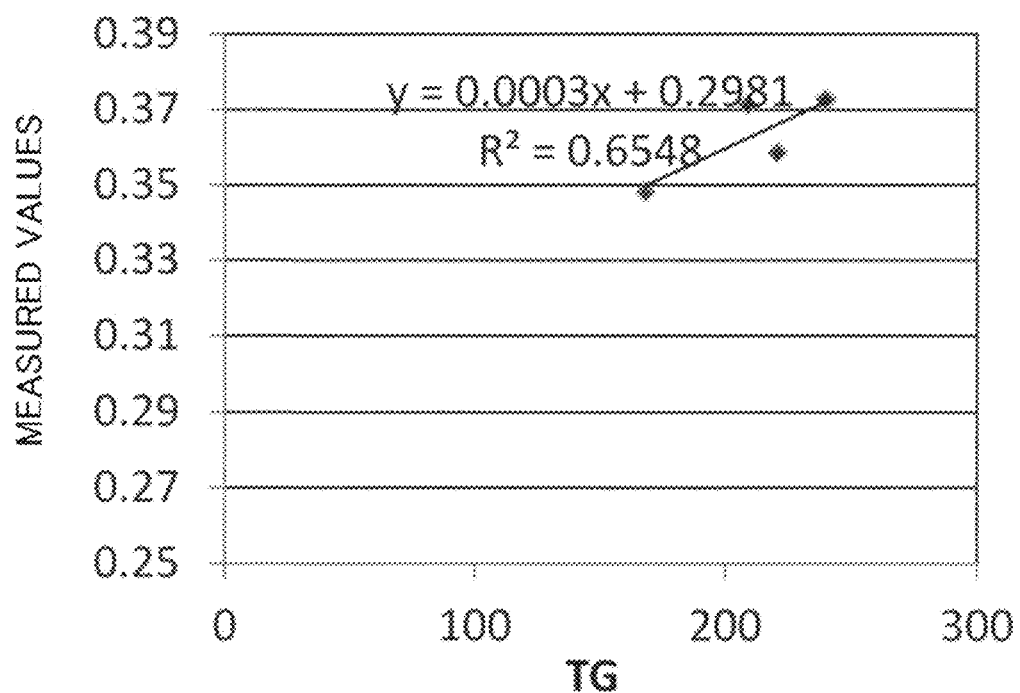
FIG. 10B is a diagram showing the relationship between the blood lipid levels and the measured values in the human lipid absorption test.

For actually proving the blood vessel angle information from Arithmetic expression 4 in Formula 11, verification of an error determination function in the blood vessel detection device of the embodiment was conducted in the human lipid absorption test. First, measurement was carried out at a portion where a vein was present, using a vein visualization device; and FIG. 10A shows a correlation between blood lipids (TG) and measured values (before excluding errors). A correlation when Formula 5 (Arithmetic expression 1) excludes points out of the constant range (after excluding errors) is shown in FIG. 10B. As shown in FIG. 10A and FIG. 10B, by excluding the error determination points, a R-squared value, which represents a correlation between the blood lipid concentration found by blood sampling and the measurement result from the optical measurement, has been improved from about 0.35 to about 0.655.

The notification unit 6 of the embodiment is a buzzer, a vibrator, a lamp, a liquid crystal screen, or the like. When the controller 5 determines that the blood vessel is present at a suitable portion for detection, the controller 5 sounds a buzzer, vibrates, turns on a lamp, or displays notification on a liquid crystal screen. In this manner, a user is notified that the blood vessel position is suitable for measurement.

The notification unit 6 of the embodiment notifies the user of an error when the controller 5 determines that the optimal blood vessel arrangement is not achieved. The notification method includes sounding a buzzer, vibrating, turning on a lamp, or displaying notification on a liquid crystal screen. In this way, the user is notified that the measurement is error.

In the blood vessel detection device 1 of the embodiment having the above-described configurations, based on the program that is preset, the blood vessel detection device 1 executes the blood vessel detection processing. FIG. 11 is a flowchart of the blood vessel detection processing of the embodiment.

The first irradiation unit 2 or the second irradiation unit 3 irradiates the irradiation position 21 with a continuous light via a light-shielding plate having the direction regulation unit for enhancing the linearity of the irradiation light (step 101).

The first light intensity detection unit 41 detects the light intensity at the first detection position 441, and the second light intensity detection unit 42 detects the light intensity at the second detection position 442. Of the light of the second irradiation unit 3, the light intensity detection unit 46 detects the light intensity at the third detection position 446, and the light intensity detection unit 45 detects the light intensity at the fourth detection position 445 (step 102).

The controller 5 calculates the blood vessel information, such as the effective attenuation coefficient μeff and the coefficient of variation CV, in the living body based on the light intensity detected by the light intensity detection unit 4 (step 103).

For example, the controller 5 calculates the effective attenuation coefficient μeff by taking a logarithm of the light intensities at a plurality of positions detected by the light intensity detection unit 4. The controller 5 calculates the effective attenuation coefficient μeff based on a phenomenon that the irradiated light is gradually attenuated due to scattering as the distance to the detection position 44 increases.

Based on the blood vessel information, such as the light intensity I, the effective attenuation coefficient μeff, and the coefficient of variation CV, the controller 5 calculates the blood vessel arrangement information, such as the blood vessel depth information and the blood vessel angle information, represented by Formula 5, Formula 7, Formula 10, and Formula 11 (i.e., Arithmetic expressions 1 to 4) (step 104). Detailed description of Formula 5, Formula 7, Formula 10, Formula 11, and the calculation method of the blood vessel depth information and the blood vessel angle information are as above.

The controller 5, when the blood vessel depth information and the blood vessel angle information are within the constant range that is preset based on the experiment using the blood vessel phantom (step 105), determines that the position is at the optimum blood vessel position. When the above information is out of the certain range, the controller 5 determines that the measurement is error.

When determining that the position is at the optimal blood vessel arrangement, the controller 5 performs the notification control on the notification unit 6 to turn on the lamp or display notification on the liquid crystal screen. Alternatively, the same control is performed when an error is determined (step 106).

As described above, according to the blood vessel detection device and the method of the same of the present embodiment, based on the detected light intensity and the blood flow information, it is possible to determine whether or not the blood vessel arrangement is suitable for the measurement of components in the blood vessel.

In addition, in the error determination method using the blood vessel detection method of the embodiment, from the calculation result based on the received light intensity obtained by the controller, when the concerned position is not appropriate for the measurement, this is notified by the notification unit.

In other words, it is possible to determine whether nor not the measurement position is suitable for the measurement of blood.

According to the blood vessel detection device and the method of the same of the embodiment, when the measured value deviates during the measurement, this measurement can be excluded as an invalid measurement. Even if the measurement cannot be performed at the optimum measurement portion, the measurement can be excluded by questioning the reliability of the data.

EXAMPLE

Example of the present invention will be described, hereinafter; however, the present invention is not limited to the following Example.

In the human lipid absorption test, the error determination function in the blood vessel detection device of this example was verified. First measurement was performed at the position at which a vein was determined to be present using the vein visualization device; and a correlation between blood lipids (TG) and measured values is shown in FIG. 12A (before excluding errors). Further, FIG. 12B shows a correlation when Formula 5 excludes points out of the certain range (after excluding errors). As shown in FIG. 12A, FIG. 12B, by excluding the error determination points, a R-squared value, which represents a correlation between the blood lipid concentration found by blood sampling and the measurement result from the optical measurement, has been improved from about 0.788 to about 0.869.

Although the embodiment has been described above, this embodiment is presented as an example and is not intended to limit the scope of the invention. This novel embodiment can be implemented in various other embodiments, and various omissions, replacements, and changes can be made without departing from the gist of the invention. This embodiment and its modifications are included in the scope and gist of the invention, and are also included in the scope of the invention described in the claims and the equivalent scope thereof.

REFERENCE SIGNS LIST

1 blood vessel detection device
2 first irradiation unit
3 second irradiation unit
4 light intensity detection unit
5 controller
6 notification unit

The invention claimed is:

1. A blood vessel detection device comprising:
a first irradiation unit that irradiates a predetermined position of a subject with a light having a first wavelength with a smaller absorption by hemoglobin or by water and a light having a second wavelength with a larger absorption by hemoglobin or by water than that of the first wavelength;
a second irradiation unit that irradiates the predetermined position of the subject with a light having a third wavelength with a smaller absorption by hemoglobin;
a light intensity detection unit that detects a light intensity at not less than one position, the light intensity emitted from the subject at a predetermined distance or at continuous positions from irradiation positions of the lights from the first irradiation unit and the second irradiation unit; and
a controller that calculates blood vessel depth information based on light intensities of a plurality of wavelengths of either the first wavelength or both of the first wavelength and the second wavelength, calculates blood vessel angle information based on light intensities of not less than one wavelength of either the third wavelength or both of the first wavelength and the third wavelength, and determines a position suitable for measurement based on the blood vessel depth information and the blood vessel angle information.

2. The blood vessel detection device according to claim 1, wherein
the first wavelength is 750 nm or more and 850 nm or less, and the second wavelength is 500 nm or more and 600 nm or less, or 900 nm or more and 1200 nm or less.

3. The blood vessel detection device according to claim 1, wherein the third wavelength is 650 nm or more.

4. The blood vessel detection device according to claim 1, wherein the controller calculates the blood vessel depth information from Arithmetic expression 1 or Arithmetic expression 2,

[Formula 12]

(blood vessel depth information) ∝

$$(\text{Arithmetic expression 1}) = \left(\frac{\mu_{\text{eff}}^{\lambda 2}}{\mu_{\text{eff}}^{\lambda 1}}\right)^2 \cong \frac{\mu_a^{\lambda 2}}{\mu_a^{\lambda 1}}$$

where, in Arithmetic expression 1, μeff is an effective attenuation coefficient, λ1 and λ2 are the first wavelength, and μa is an absorption coefficient,

[Formula 13]

(blood vessel depth information) ∝

$$(\text{Arithmetic expression 2}) = 1 - \frac{\left(\frac{\mu_{\text{eff}}^{\lambda 4}}{\mu_{\text{eff}}^{\lambda 3}} - 1\right)}{\left(\sqrt{\frac{\mu_{a\_blood}^{\lambda 4}}{\mu_{a\_blood}^{\lambda 3}}} - 1\right)}$$

where in Arithmetic expression 2, μeff is the effective attenuation coefficient, λ3 is the first wavelength, λ4 is the second wavelength, and μa is the absorption coefficient.

5. The blood vessel detection device according to claim 1, wherein the controller calculates the blood vessel angle information from Arithmetic expression 3 or Arithmetic expression 4,

[Formula 14]

(blood vessel angle information) =

$$(\text{Arithmetic expression 3}) = \frac{I_5^{\lambda 5}}{I_6^{\lambda 5}}$$

where in Arithmetic expression 3, $I_n$ (n is the number of the light intensity detection units) is a light intensity detected by a nth light intensity detection unit, and λ5 is the third wavelength,

[Formula 15]

(blood vessel angle information) =

$$(\text{Arithmetic expression 4}) = \frac{CV\mu_{\text{eff}}^{\lambda 7}}{CVI_5^{\lambda 6}}$$

where in Arithmetic expression 4, a numerator is a coefficient of variation CV of the effective attenuation coefficient µeff, a denominator is a coefficient of variation CV of the detected light intensity $I_n$ (n is the number of the light intensity detection units), $\lambda 6$ is the third wavelength, and $\lambda 7$ is the first wavelength.

6. The blood vessel detection device according to claim 1, wherein the irradiation unit has a direction regulation unit for enhancing rectilinear propagation of the irradiation light, on an irradiation surface of the irradiation unit, and the direction regulation unit includes a pinhole or a lens.

7. A blood vessel detection method comprises:
  irradiating a predetermined position of a subject with a light having a first wavelength with a smaller absorption by hemoglobin or by water, a light having a second wavelength with a larger absorption by hemoglobin or by water than that of the first wavelength, and a light having a third wavelength with a smaller absorption by hemoglobin;
  detecting a light intensity at not less than one position, the light intensity emitted from the subject at a predetermined distance or at continuous positions from irradiation positions of the lights;
  calculating blood vessel depth information based on light intensities of a plurality of wavelengths of either the first wavelength or both of the first wavelength and the second wavelength;
  calculating blood vessel angle information based on not less than one light intensity of either the third wavelength or both of the first wavelength and the third wavelength; and
  determining a position suitable for measurement based on the blood vessel depth information and the blood vessel angle information.

* * * * *